United States Patent Office 2,764,159
Patented Sept. 25, 1956

2,764,159

ABSORBABLE PRODUCTS

Joseph N. Masci, Metuchen, N. J., and William H. Ashton, Philadelphia, Pa., assignors to Johnson & Johnson, a corporation of New Jersey Application June 6, 1952, Serial No. 292,146

28 Claims. (Cl. 128—296)

This invention relates to materials suitable for use in surgery, which, upon being implanted in the body, will be completely absorbed thereby. In certain aspects the invention relates to products which are characterized by being both completely absorbable and hemostatic.

A variety of compositions have been previously suggested for implantation into the body to arrest the flow of blood in surgical operations. It will be appreciated that such materials must be both completely absorbable by the body and hemostatic. Oxidized cellulose is one such hemostatic agent which has been used. Although efficacious, oxy-cellulose suffers from several well-recognized disadvantages. One of its most serious shortcomings is its susceptibility to degradation upon storage. If it is to be kept for any appreciable length of time, it must be stored under refrigeration, and even under these conditions its shelf life is not nearly as long as desired. For the same reason it cannot be steam sterilized nor exposed to dampness for any appreciable length of time. Further, oxy-cellulose is very difficult to prepare. It is manufactured by treating cotton fibers or gauze with nitrogen oxides under conditions which must be very carefully controlled to produce a product having acceptable properties. If reaction conditions are not controlled according to specification, the resulting product may be insufficiently hemostatic or may cause irritation when implanted in the body or may cause abnormal "foreign body" reaction. It will be apparent that the stringent requirements for manufacture of oxy-cellulose unavoidably result in high cost, which is a further disadvantage. Since oxy-cellulose is usually produced by chemically treating the gauze or cotton without change in physical form of the latter materials, the resulting hemostatic agent is readily available only in the form of gauze or fibers. In many instances, surgeons would prefer to have the hemostatic agent in other physical form, for example, a molded block, possibly of sponge-like structure, which would have some resiliency.

Other materials have been proposed as hemostatic agents. Alginic acid is hemostatic and absorbable, but in some cases has been found to be somewhat more irritating than desired. Gelatin-like products have been suggested, but these compounds, although absorbable, are not hemostatic in themselves. At best, they act as an adhesive barrier which may physically retard the flow of blood from the wound, while relying upon the clotting properties of the blood itself to produce hemostasis. Generally, to insure such an effect, the gelatin sponge is soaked in a thrombin solution before use.

Desirable hemostatic agents, in addition to being hemostatic and absorbable, also should preferably be reasonably water-insoluble and have a reasonable degree of strength even when wet with the body fluids. This is necessary in order that it may be handled without deterioration as well as to be certain that it will remain in place for time to cause hemostasis rather than being carried away or dissolved. It is further desirable that the hemostatic agent have physical properties that permit it to be readily cut into pieces which conform in size and shape to the contour of the area being treated.

In many instances fabricated articles would find use in surgery by virtue of their property of complete absorbability, the property of hemostasis being relatively secondary. Examples are sutures and films which might be used as temporary barrier elements. Starch sponges have been proposed as absorbable medicament carriers. However, starch sponges are undesirably hard and friable, and lose the major part of their strength when wet. Accordingly, one object of the invention is to develop articles which are completely absorbable within a reasonable length of time, and do not have the disadvantages of other products.

A further object is to develop compounds and fabricated articles which are completely absorbable, hemostatic, and possess minimum disadvantages of prior hemostatic agents and optimum properties from the standpoint of stability, cost of manufacture, sterilizability, etc. The hemostatic absorbable agent should be capable of being sterilized, preferably by either heat or chemical treatment. They should not produce abnormal "foreign body" or "tissue" reaction.

The products of this invention, which are completely absorbable by the body internally and also otherwise fulfil the objects set forth above, are cellulose glycolic acid ethers in free acid form which have degree of polymerization within a certain well-defined range, preferably those which have been rendered substantially water insoluble by the procedure exemplified below. Particular advantageous products have controlled degree of substitution and degree of neutralization (each defined hereinafter).

Cellulose glycolic acid ether free acid may be described structurally as:

where $x$ is not greater than 3 and $y$ is a large whole number.

The ring structure represents the anhydroglucose residue which is linked in known manner to similar residues on either side to form a long chain cellulose structure. The bracketed H atoms are attached to oxygen atoms in the anhydroglucose residue in known fashion. Similarly, the (CH₂—COOH) groups are attached to the residue through oxygen linkage by substituting for the aforementioned H atoms. The effects which the values of $x$ and $y$ in the above formula have on the invention hemostatic absorbable materials are discussed below. The ether may exist as the free acid or a salt. Hence, the term cellulose glycolic acid ether as used herein includes both the free acid and its derivatives, such as salts.

An outstanding advantage of the invention products is that they can be prepared in a great variety of forms. This is brought about by solvating, preferably hydrating, the cellulose glycolic acid ether free acid or salt thereof into a fluid or plastic which readily flows under pressure and recovering the solid de-solvated free acid from this plastic or fluid material in desired form. Cellulose glycolic acid ether which has been reconstituted, as the term is used herein, is that which has been put into such fluid or plastic state and thereafter recovered from said state as a solid. Material which is still in the unreconstituted physical state of the original cotton linters, or fibers, etc. is designated herein as native or natural material.

In surgery there has been need for films which can be used as barrier layers or liners, for example, in brain surgery, and which, upon being left inside of the body, will be completely absorbed in a relatively short period of time so as to give rise to minimum abnormal foreign body reaction. A film which is completely absorbable and which has other properties, such as strength, desired for use in surgery can be prepared from cellulose glycolic acid ether by forming an aqueous solution of its sodium salt, which may be purchased on the market, making suitable adjustment, hereinafter described, in the properties of the material, casting the solution into a film, for example, by acidification with aqueous or aqueous-alcoholic mineral acid, purifying the film and then preferably converting it to a water-insoluble form. The details of this procedure are described in greater length below.

The cellulose glycolic acid ether of the present invention also possesses favorable properties from the standpoint of suture material, since it is completely absorbable. Further, filaments or strands over a wide range of diameters having satisfactory strength can be prepared by spinning an aqueous solution of the sodium salt into suitable precipitant instead of casting it into a film as described above. Fine filaments may be spun into suture thread, or coarser filaments can be used as such for suturing. The invention therefore affords a method by which sutures may be made to supplement the limited supply of "catgut" sutures. Both film and suture can be sterilized even by the rigorous heat treatment without suffering appreciable degradation.

As previously indicated herein, surgeons would prefer in many instances to have hemostatic absorbable material in physical form other than the conventional loose or woven fibrous forms. One embodiment of the present invention comprises producing a "sponge" of the cellulose ether free acid. The "sponge" may be described as having cellular structure with the voids or air pockets unconnected, or connected with each other, depending largely upon the method of manufacture. For example, an aqueous solution of the cellulose glycolic acid ether sodium salt may be mixed with crystals of a water-soluble inorganic salt, such as Glauber's salt, the cellulose ether precipitated by treatment with aqueous, or if necessary, aqueous-alcoholic mineral acid, and the system then washed thoroughly with water to remove mineral acid and salts. The Glauber's salt crystals, upon being washed away, create void spaces in the cellulose glycolic acid ether, thereby resulting in cellular or "sponge" structure. Alternatively, puffing agents, which generate gas when heated, may be used in making sponges. If desired, soluble gases, such as $CO_2$, $N_2O$, or mixtures thereof, can be dissolved, under pressure, in a solution of the cellulose glycolic acid ether. When the pressure is relieved, the gas will escape from solution in the form of extremely small bubbles, and will expand to produce a foam. The foam may be frozen and dried into a sponge.

A preferred procedure for sponge manufacture comprises "lyophilizing," which means freezing a solution of the free acid cellulose glycolic acid ether and removing solvent by drying under vacuum. To produce a sponge having satisfactory physical properties, including mechanical strength, the solution to be frozen should contain at least about 0.5% solids. Above about 10% solids solutions produce sponges having a generally undesirable stiffness, and hence such higher concentrations are preferably avoided. Preferred solutions for lyophilization are aqueous and contain about 2 to 7% solids.

Just as in the case of the film or suture, the sponge after manufacture is preferably insolubilized by suitable treatment. It may be readily cut into pieces which conform in size and shape to the contour of the area being treated. In this way, the invention cellulose glycolic acid ether is fabricated so as to satisfy a previously unfilled need of the medical profession.

By suitable designing, technique of manipulation, and molding, the invention absorbable material may be placed in a variety of physical forms other than the film, suture, or sponge. If desired, the cellulose glycolic acid ether, after reconstitution from the original linters or fiber, may be pulverized to any desired mesh size to a powder useful as a hemostatic agent or as a dusting powder for surgeons' gloves.

A powder composed of particles below about 20 mesh size prepared by comminuting a free acid cellulose ether sponge has desirable porous properties and large surface area. It wets more quickly than other powders, thereby affording potentially more rapid and improved hemostasis.

The sponge material, preferably though not necessarily in comminuted form, as described below, may be compressed into absorbable pellets to be used, e. g., in dental surgery. These pellets retain their compressed form, without application of external force, when dry, but when they are treated with liquid water they rapidly swell to many times their original value while still retaining their general shape and without disintegrating appreciably.

A universally important property of the invention products is their capability of being completely absorbed internally by the body within a reasonable length of time. According to the invention, completely absorbable materials are made of free acid cellulose glycolic acid ether by reducing the average length of the cellulose chain. In the present application the length of the cellulose chain is indicated by the viscosity of a standardized solution measured under standardized conditions. That is, the free acid cellulose glycolic acid ether is dissolved in a 0.50 N. NaOH solution. This solution is tested for viscosity in a modified Ostwald-Fenske viscosimeter pipette ASTM D-445 #300 at 25.50° C. The viscosity reading is obtained in seconds. The zero reading, run on a 0.50 N. NaOH solution at 25.50° C. in the same apparatus, is 5.0 seconds. Thus, in the present application where the term "viscosity" is used, the values are given in terms of seconds, which values are determined by the above standardized technique and refer to a 5.0 zero pipette reading. Low viscosity readings reflect a material in which the length of the cellulose chain has been reduced to a relatively greater extent (i. e., low degree of polymerization (D. P.) material), whereas high viscosity readings indicate that the chain length of the material has been reduced relatively less (high D. P. material). The degree of polymerization is indicated in the above structural formula by the letter $y$.

The free acid cellulose ethers of the present invention having advantageous properties from the standpoint of absorbability are those having viscosity not greater than 17.4 seconds measured by the above standardized procedure. Although reconstitution of the cellulose ether in most instances is a necessary step, as noted above, to place the material in physical form suitable for most advantageous use, our investigation indicates that this reconstitution tends to render the free acid cellulose ether less absorbable than the cellulose ether in the native form would be. It is of notable importance that according to the present invention completely absorbable material is made even from the more difficulty absorbable reconstituted free acid cellulose ether by reducing the D. P. to a value not greater than indicated by the 17.4 second viscosity. Cellulose ether having desired D. P. may be prepared by a variety of methods which are explained at length and exemplified below. At very low D. P., water solubility may become quite high, with corresponding deterioration of physical properties of the free acid cellulose ether and/or article fabricated therefrom. Further, low viscosity material is more difficult or impossible to convert to the preferred insoluble state, for example, by the heat treatment described below. Hence, viscosity reading in seconds, determined by the procedure outlined above, should be at least about 5.7, as compared with a zero pipette reading of 5.0 seconds. The preferred range of viscosity, particularly from the standout of optimum absorbability of the free acid cellulose ether articles of the invention is about 5.7 to 12.0 seconds.

After the free acid cellulose glycolic acid ether has been prepared in a form suitable for final consumption, be it powder, sponge, film, or suture, etc., it is preferably treated to insolubilize the free acid cellulose ether. A preferred way of bringing about insolubilization is to heat it at carefully controlled elevated temperature for time sufficient to convert to a state which has been found to be quite insoluble in water and may be properly described as "refractory." Formation of refractory material begins to take place at an appreciable rate at about 150° F., particularly in the presence of gaseous formaldehyde, which may be used for sterilization as described below. At this temperature at least about 30 minutes are required to effect a substantial decrease in solubility of the acid ether as compared with non-heat treated material. Conversion occurs at a substantially faster rate at temperautres of at least about 180° F. Heating time in each case is preferably at least about 30 minutes. Within the heating time of about 2½ to 3 hours, optimum insolubility is obtained.

Temperatures of about 210° F. and above generally afford substantially higher rates of conversion of the soluble to the insoluble forms of acid ether. The temperature in any case is maintained below levels at which appreciable carbonization of the cellulose ether occurs, within the minimum time in which the material can be handled at the elevated temperatures in question. 350° F. is about a maximum temperature. Preferably, it is held about 250° F. or below. Any source of heat is suitable for bringing about insolubilization. Hot air or infra-red ovens, induction heating devices, indirect or dry open steam, hot plates, or heated irons may be used. In large scale operation, hot air ovens, which are standard equipment, are preferred.

Before use, the article fabricated of cellulose ether will be sterilized. This may be effected by conventional steam sterilization using open steam at temperatures of 212 to 250° F. for 15 to 60 minutes. If is it desired to employ lower temperatures, the articles may be sterilized by chemical methods, e. g., with ethylene oxide, or heating at about 140 to 170° F. for 1 to 3 hours in an atmosphere containing moisture and a high concentration of gaseous formaldehyde. In many instances insolubilization and sterilization may be obtained simultaneously in a single operation by controlling temperature and time of treatment to meet the requirements of each process.

The degree of substitution (D. S.), a term commonly employed in connection with cellulose derivatives of the nature of the invention absorbable products, is an important property and indicates the average number of substituent groups per glucose unit in the cellulose molecular chain (i. e., the value of $x$ in the above formula). Since there are three hydroxyl groups, and hence three possible points of substitution per glucose unit, maximum D. S. is 3.0. It has been found according to the present invention that the degree of substitution is a critical factor in determining the hemostatic activity and also the absorbability and solubility of the particular acid cellulose ether. That is, as D. S. increases above zero, hemostatic activity, absorbability, and solubility also increase. Since absorbability is a property of primary importance in the products of the present invention, the degree of substitution in every case will be sufficient to afford adequate absorbability. Preferably, since aqueous solutions (of the free acid or its salt) are conveniently used in preparation of the articles of the invention, material is employed having a D. S. sufficiently high to afford water solubility of the salts, such as the ammonium or sodium salt, to produce solutions used in fabrication of invention articles.

A still more preferred minimum D. S. value from the standpoint of water solubility is that at which the sodium salt, upon acid precipitation in aqueous solution, forms a gel rather than a less soluble flocculent precipitate. It will be apparent from ensuing explanation that the gel is useful in preparing certain forms of invention products. In the invention products, important from the standpoint of their hemostatic properties, material is employed having degree of substitution to afford adequate hemostatic activity. Compounds having D. S. above about 0.5 generally have adequate absorbability, solubility, and hemostatic properties. Preferred cellulose ethers have D. S. about 0.7 and above. The preferred maximum D. S. is about 2.0.

It is important to retain in the acid cellulose ether an adequate number of carboxyl groups whose hydrogen atoms are not replaced by salt-forming radicals such as ammonium or alkali metal. In other words, the degree of neutralization (D. N., percentage of carboxyl groups replaced by such salt-forming radicals) should be maintained below certain limits. The free carboxyl groups apparently play a part in blood coagulation. Further, a certain number of free carboxyl groups is believed to be necessary to make the compounds susceptible to conversion to the desired insoluble form as described above. The following table contains results of tests on insolubilization of free acid cellulose glycolic acid ether sponges having D. S. of 1.2 and D. N. as indicated, by drying the sponges in hot air and heating the dried sponges at 180° F. for 3 hours. The sponges were tested by immersing in water at room temperature before and after heat treatment.

| Percent D. N. | | Viscosity, Seconds | Observation | |
|---|---|---|---|---|
| | | | Before Heat Treatment | After Heat Treatment |
| 25 | Test A | 11.2 | Swells and slowly dissolve. | Retains form. |
| | Test B | 15.4 | Swells but doesn't dissolve. | Do. |
| | Test C | 11.6 | Swells and dissolves. | Do. |
| 50 | Test A | 17.1 | Slowly dissolves | Swells but does not dissolve. |
| | Test B | 17.5 | do | |
| | Test C | 15.0 | Dissolves | Swells — Gelatinous. |
| 75 | Test A | 16.0 | do | Dissolves. |
| | Test B | 17.4 | do | Do. |
| | Test C | 15.5 | do | Do. |

At 75% D. N. the cellulose ether could not be insolubilized, whereas the 50% D. N. material was substantially insolubilized. The invention contemplates use of materials having D. N. of 60% or below, and in each case low enough so that there is at least an average of 0.50 free COOH groups per glucose ring in the molecule. Preferred materials have D. N. about 15% or below. As indicated hereinafter, however, raw materials or intermediates used to prepare the invention products may be appreciably or completely neutralized so long as the D. N. is reduced in the final product.

There is a variety of alternate procedures for preparing the completely absorbable reconstituted free acid cellulose ethers. In general there are four procedural steps.

1. The cellulose glycolic acid ether or its salt is solvated, preferably hydrated, to a fluid or plastic state, such as a solution. The solution will generally be aqueous, although this is not limiting. Any liquid having solvent properties may be substituted for water. Generally the cellulose ether will be placed in solution in the form of one of its readily soluble metal salts, such as sodium, potassium, or ammonium. However, if the cellulose ether has sufficiently high D. S., the acid ether itself may be solvated, i. e., transformed into a gelatinous state, or even dissolved in water by treatment at high pressure and temperature. Cellulose glycolic acid ether either dissolved or hydrated in this fashion is suitable for preparation of reconstituted articles according to the invention.

2. Inorganic salts and free mineral acid are removed from the cellulose ether. This step includes reducing D. N. as desired, which may be accomplished, in the case of cellulose ether ammonium salt, by heating dry material at temperature of at least 50° C. to drive off ammonia. Optionally, dialysis using a semipermeable membrance, a cellulose ether solution on one side of the membrane and water on the other side, may be employed for any of the salts. Electrodialytic technique may be utilized with more expeditious results. If the cellulose ether is present in the gel of flocculent precipitate form, this purification may be carried out by a simple repeated and extensive washing. Various ion exchange compounds, such as resins, are known which have the property of sequestering inorganic metallic cations and anions. These ion exchange materials are suitable for recovering purified acid ether from solutions of its salts.

3. The cellulose ether in the form of free acid solution or gel or metal salt solution, etc., is de-solvated, e. g., dehydrated. A preferred procedure for carrying out dehydration is by lyophilization, i. e., freezing and then drying under high vacuum. This technique results in the production of a sponge-type product. Precipitation with aqueous mineral acid will lead to effective dehydration in cases where the D. S. of the cellulose ether is sufficiently low so that a flocculent precipitate, is formed. In any case, even with material having higher D. S. and consequent higher water solubility, the desired form of precipitate can be obtained by using alcoholic or aqueous alcoholic mineral acid instead of aqueous mineral acid as precipitant.

4. The cellulose ether is treated to reduce its molecular weight and D. P. into the critical range which has been found, according to the present invention, to afford complete absorbability of the material by the body tissues.

The first three steps need not be carried out in the order given. However, step 3, dehydration, must come after step 1, dissolving. Step 4 may be at any stage in the process, but is preferably performed when the cellulose ether is in the purified free acid hydrated form, such as an aqueous solution of the free acid prepared by electrodialysis of sodium salt solution.

Figure 1:
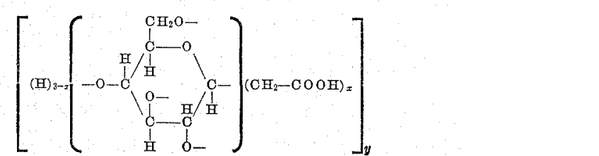

The attached drawing is a diagram of several ways of preparing the acid cellulose ether absorbable products of the invention. Steps 1, 2 and 3 of the method are represented by various geometric figures, i. e., step 1 by a circle, step 2 by a broad base triangle, and step 3 by an inverted triangle. Beginning with cellulose ether sodium salt in the form of the original cotton linters or fibers at 10, an aqueous solution of the salt may be prepared as shown at 11 in the drawing. This accomplishes step 1 of the process. The cellulose ether salt may be precipitated from this solution with either alcohol at 12 (as the sodium salt) or strong mineral acid at 13 to form a film, suture, powder, or sponge (of the free acid). This is step 3 of the process. The alcohol-precipitated material at 16 is then acidified at 18 and washed thoroughly at 19, and the acid-precipitated material at 17 merely washed thoroughly at 20 to carry out step 2, removal of metallic ions. Each is then dried and preferably insolubilized as by treatment at elevated temperature.

An alternative procedure is to acidify the aqueous solution of cellulose ether sodium salt to form a gelatinous material at 26 and wash the gel thoroughly with water at 27 to remove metallic ions (step 2). At this point there are several alternative procedures. The de-ionized gel may be frozen solidly at 30 and freeze dried (lyophilized) at 31 to form a sponge, or converted to the ammonium salt in aqueous solution at 47a and treated according to the procedure described below, or, under suitable conditions, dried at 32 to produce a film or sponge.

A preferred procedure for treatment of the aqueous sodium salt solution is to subject it to dialysis or ion exchange at 35 to remove ions (step 2). Details of dialysis and ion exchange are discussed at greater length and exemplified hereinafter. The dialyzed or ion-exchanged solution is preferably frozen at 30 and lyophilized at 31 to form a sponge, but may be precipitated with alcohol at 36 to form a film, suture, powder, or sponge at 37, and dried at 38. Alternatively, the dialyzed or ion-exchanged solution at 35 may be converted to an aqueous solution of the ammonium salt at 47a and treated as hereinafter described.

Beginning with the cellulose ether sodium salt in native linters or fiber form at 10, it may be treated with alcoholic acid at 40 without dissolving to produce free acid cellulose ether in linters or fiber form at 41 and washed thoroughly at 42 to remove acid and inorganic ion impurties (step 2). The latter material may be dissolved in water with heat and pressure at 45 or merely hydrated without solution under these conditions to produce a fluid or plastic material which readily flows under pressure. The hydrated cellulose ether acid may be frozen at 30 and lyophilized at 31 to form a sponge, or precipitated with alcohol at 36 to produce a film, suture, powder, or sponge, followed by drying at 38.

The washed free acid cellulose ether linters or fiber indicated at 42 in the drawing may be converted to the ammonium salt and dissolved in water at 47. The ammonium salt solution may be either boiled to drive off ammonia at 48, followed by freezing at 30 and lyophilization at 31; or precipitated with alcohol at 50 to produce a film, suture, powder, or sponge at 51, which is dried at 52 and then heated at 53 to drive off ammonia; or frozen directly into a solid mass at 55, which is lyophilized at 56 and then heated to drive off ammonia at 53.

In each case, the preferred procedure calls for treating the end product, as by heating, to convert it to the insoluble and refractory form.

The important step of reducing D. P. of the cellulose ether may be accomplished at any stage of the processes described. For example, the cellulose ether sodium salt, ammonium salt, or free acid, each in the form of native linters, may be heated as by open steam for time sufficient to reduce the chain length of the cellulose (indicated by viscosity) to the desired range. Similarly, the finished product, such as film, suture, powder, or sponge, may be heated at the effective temperature level and for sufficient time to bring about reduction in chain length. Alternatively, the solution of the free acid or any of its salts may be subjected to degree of polymerization reducing conditions for the required time.

It is preferred to carry out reduction of D. P. while the cellulose ether is in the form of its purified aqueous free acid solution. Referring to the attached drawing, this will be at the points designated by the letter A.

One method of obtaining the desired degree of polymerization is to heat the cellulose ether at an elevated temperature for time to reduce the length of the cellulose chain as required, preferably in the presence of liquid water. However, the presence of liquid water is not essential, and the reduction in chain length may be brought about by steam or even heat alone. As temperature is increased, rate of splitting of the cellulose molecule also increases, and accordingly, for this operation temperature is maintained sufficiently high to produce acceptable reaction rate. A minimum temperature of about 180° F. will generally effect an acceptable rate of splitting of the cellulose chain. However, chain splitting occurs at much lower temperature, even at room temperature, when strong mineral acid is present for an extended period of time. Temperature should be maintained below levels at which carbonization, uncontrolled degradation of the cellulose, or other undesirable side effects are produced. Generally, the maximum feasible temperature is about 350° F., 250° F. being a preferred upper limit when liquid water is present, e. g., when the cellulose ether is in aqueous solution.

When cellulose ether free acid or sodium salt is to be treated in the dry condition, heating at 180° F. for one day or more affords an easily controlled operation. At 300° F., which is a preferred upper limit for this type operation (absence of liquid water), heating time will generally not be longer than two hours. Since the sodium salt is somewhat more stable than the free acid cellulose ether, slightly higher temperature or longer heating time is usually necessary to effect a given reduction in D. P.

In the presence of liquid water, be it solution or mere physical mixture, reduction in D. P. takes place somewhat more rapidly or at lower temperature. For instance, a cellulose ether free acid (having D. P. indicated by 15 seconds viscosity) in a 5% aqueous solution prepared by electrodialysis, if heated at 200 to 210° F. for about 17 hours, will be found to have undergone reduction in viscosity to about 7.6 seconds. Autoclaving an aqueous solution of 26 second viscosity free acid cellulose ether at 250° F. for about 20 minutes will effect reduction in viscosity to about 8.0 seconds.

One novel phase of this development is the discovery of a method for solubilizing or hydrating free acid cellulose ether which is in an insoluble or "refractory" form without resorting to use of alkalies. Refractory acid cellulose ether can be boiled in water for hours without dissolving or solvating appreciably. Howeven, by applying heat and pressure in the presence of liquid water, dissolution or hydration takes place quite readily. The operation is represented at 45 in the drawing, but is not limited to treatment of powders or fibers. Any form of cellulose ether free acid, such as sponges or films, gives similar results. By controlling the heat treatment, a great many forms are possible, ranging from a thick gel through a smooth paste to a thin solution. Various uses may be found for the different products obtained. Each type of cellulose glycolic acid ether has its own conditions of optimal treatment depending on the degree of substitution, degree of polymerization, and use for which it is intended. Consequently, it is not possible to specify all the detailed ramifications. Generally, temperatures above 212° F. to as high as 350° F. over periods of time ranging from five minutes to one to two days at autogenous pressure in each case and in concentration of solids as desired are satisfactory. Temperatures between 225° F. and about 250° F. are preferred.

The solubilizing or hydrating of refractory cellulose ether has a bearing on the important step of reducing D. P. of the material to produce an absorbable product, since during the heat-pressure treatment reduction in D. P. of the cellulose ether also occurs. Temperature, time of treatment, water concentration, D. S., and initial D. P. may be selected to obtain a variety of products. For example, a dried water-insoluble free acid cellulose glycolic acid ether of D. S. of 1.21 and D. P. indicated by 26.8 second viscosity (standardized procedure) when sealed in a tube at 30% concentration in water and heated for two hours at 235° F. produced a clear jelly. The same treatment of D. S. 0.90, D. P. 8.4 second viscosity insoluble cellulose ether at 250° F. for 2½ hours produced a thick solution. Any of these materials may be utilized in preparing absorbable products of the invention according to the procedure which has been described.

Reduction in cellulose chain length may be advantageously brought about by treating the cellulose ether with cellulase enzyme which is characterized by having chain-splitting action toward cellulose. "Enzyme 19 AP," put out by Rohm & Haas Company, is suitable. The enzymes may be added and reduction in chain length effected when the cellulose ether is in solution in the form of its sodium salt, that is, at point 11 on the drawing. Enzymatic reduction in chain length may also be carried out on the cellulose ether ammonium salt, provided there is no appreciable excess ammonia present. Preferably enzyme treatment is carried out when the cellulose ether is in the form of the free acid in aqueous solution, in the absence of mineral acid and alcohol, i. e., points designated by the letter A on the drawing. The concentration of enzyme, cellulose ether, and temperature are controlled to achieve the result desired. The enzyme action is permitted to continue for time to effect the desired degree of reduction in chain length. At this point the activity of the enzyme is destroyed, for example, by heating, adding excess ammonia or certain other chemicals, or arrested by freezing or drying, or the enzyme concentration can be set initially so that it is expended in the digestion.

An advantageous and preferred embodiment of the invention comprises bringing about simultaneous reduction in D. P. and reduction in D. N., e. g., the content of inorganic ionic impurities in impure cellulose glycolic acid ether. This is effected by electrodialysis of solutions of the cellulose ether under certain controlled conditions. Specifically, by maintaining temperature of the solution above about 100° F., it is found that reduction in D. P. toward or into the desired range (indicated by the 17.4 second viscosity, preferably 12.0 second viscosity) may be effected simultaneously with impurity removal. Temperatures will generally be higher where more rapid or extensive reduction in D. P. is desired. Preferred temperatures are in the approximate range 180° F. to 250° F., refluxing or pressure being utilized where necessary to prevent escape of aqueous vapors. By controlling conditions, primarily temperature, it is feasible to end up with an electrodialyzed product which is not only in the form of substantially pure free acid cellulose ether but which also has viscosity indicating a D. P. within the range of complete absorbability.

For example, it has been found that a 3% by weight aqueous solution of cellulose ether sodium salt having D. P. indicated by viscosity of 26 seconds and D. S. of 1.21 may be electrodialyzed at 130° F. at 2½ to 3 amperes, 40 to 50 volts, and with agitation in the anode chamber. Four inch by four inch 45 mesh platinum screens of 0.0085 inch diameter wire are used as anode and cathode. The space between the anode and cathode is 3 to 4 inches. The semipermeable membrane is plain transparent cellophane as a semipermeable membrane for dialysis. The operation takes place without appreciable formation of gel on the anode. Substantially pure free acid cellulose ether solution having 0% D. N., free of inorganic ion impurities, and viscosity of about 15 seconds as determined by standard procedure, is obtained as end product. Treatment of the 1 gal. charge of cellulose ether aqueous solution is completed in about 20 hours. The solution may be frozen and lyophilized for sponge manufacture.

In operations where reduction in D. P. during electrodialysis is not a particular object, lower solution temperatures may be employed. It should be maintained sufficiently high, however, to afford fluidity of the solution. In all electrodialytic procedures, solution temperature is maintained below levels at which excessive volatilization of water or deterioration of semipermeable membrane occurs. Temperatures above about 70° F. are generally suitable.

Electrodialysis affords an easily controlled and potentially high capacity method for reducing the content of inorganic ionic impurities and reducing the D. N. of the cellulose ether. In general, high capacity operation is achieved by increasing current density in the electrodialysis cell. However, current density increase must be effected judiciously, since excessively high currents may cause undesirable gelling of material on the electrodes and/or carbonizing of the cellulose ether in the vicinity of the electrodes. According to one aspect of the invention method, these undesirable side effects are avoided by the simultaneous control of solution concentration, temperature, agitation, and current density. The maximum desirable solution concentration will depend largely upon the D. P. of the particular cellulose ether. In general, concentrations above about 7% by weight are likely to produce gelling and therefore are not preferred. Voltage is maintained at a level to overcome the electrical resistance of the solution and thereby produce the current flow desired. Current densities in the range 0.01 to 4 amperes per sq. cm. of anode area are feasible.

Solutions of cellulose ether sodium salt before electrodialysis frequently have a brownish tinge of color, probably due to the presence of extraneous material other than the sodium ions with the cellulose ether. Electrodialysis of such solutions by our preferred procedure effects removal of this color, and hence electrodialysis may be said to be an inclusive purification procedure, in that it removes impurities in addition to the usual metallic ionic impurities in the free acid cellulose ether.

Still another method of preparing cellulose ether by suitably low D. P. is to fractionate a solution by incremental precipitation. For example, to an aqueous solution of the sodium salt of an ordinary cellulose ether, which is composed of molecules of size distributed over a wide range, an alcohol may be added in amount to precipitate part, but not all, of the cellulose ether. The preciiptate is removed, and more alcohol is added to the filtrate, thereby producing a second precipitate, etc. The successive fractions will generally be found to have progressively lower D. P. This method is suitable for lowering average chain length to produce low D. P. material within the scope of the invention.

The following examples illustrate the products and methods of the present invention. Parts and percentages are expressed on a weight basis unless otherwise designated.

*Example 1*

A 1% aqueous solution of cellulose glycolic acid ether sodium salt having degree of substitution of 1.2 was prepared. The degree of polymerization of the cellulose ether corresponded with viscosity of a 0.50% by weight aqueous solution of the free acid in a 0.50 N. NaOH solution at 25.50° C. equal to 26.8 seconds as determined on a modified Ostwald-Fenske viscosimeter pipette ASTM D-445 #300, as compared with a zero pipette reading of 5.0 seconds for a 0.50 N. NaOH solution at the same temperature. Concentrated aqueous hydrochloric acid was then mixed with the solution in the amount of four times the equivalent weight of cellulose ether. After about two hours a stiff gel had formed, which was then sliced into sections about 1" x 2" x 4". Several of these sections were immersed in distilled water at room temperature to extract sodium chloride and excess mineral acid from the gel. The ratio of extracting water to gel was about 30 to 1 for each batch of water. The gel was steeped in this fashion for three weeks, changing the water daily, during which time the pH of the gel increased to about 3.0. The purified gel was then removed from the bath, cut into small sections 1.5 cm. x 1.0 cm. x 10.5 cm. and frozen on carbon dioxide ice. The frozen gel bricks were lyophilized, i. e., dried while frozen under reduced pressure. The dried samples were heated for 20 hours at 120° F. in a heated air oven to remove residual water. At this point the product was a dry, light weight porous sponge of free acid cellulose glycolic acid ether having a bulk density of 0.016 gm. per cubic centimeter. Samples were prepared for implantation studies in rats by slicing off sponge segments 3 mm. cubed. The cubes were sterilized and the D. P. simultaneously reduced to the desired low value by treating it in an autoclave at 235° F. for 15 minutes in the presence of open, dry saturated steam. The product after autoclaving had a D. P. indicated by viscosity of 12.0 seconds as determined by the above standard procedure. The sterile samples were implanted under the skin of the backs of young albino rats, which were sacrificed at intervals to note the progress of absorption by the tissue. Examinations were made on the 3rd, 7th, 10th, 15th and 25th days after implantation involving a total of 20 rats, four rats per day. The sponges were substantially completely absorbed on the 7th and 10th postoperative period.

The hemostatic activity was evaluated on rat liver and spleen. The animals were anesthetized in the standard manner, a midline incision made, and the organs to be tested were exposed. A rectangular incision of uniform size was then made in the organ sufficient to produce a free flow of blood. The samples tested were placed on the wound without pressure and the time noted in minutes and seconds for the blood to cease flowing. The results were:

| Sample | Bleeding Time | |
| --- | --- | --- |
|  | Liver | Spleen |
| 1 | 0'0" |  |
| 2 | 0'50" |  |
| 3 |  | 2'40" |
| 4 |  | 2'45" |

Where 0'0" bleeding time is recorded, the blood did not wet through the sponge and hence hemostasis was practically instantaneous. Therefore, no time could be recorded. A gelatin sponge available on the market and having comparable physical structure to the sponge in Example 1 was tested for hemostatic activity on similar incisions in the rat liver and spleen. In duplicate tests 3'56" and 3'53" were required to stop the flow of blood from liver incisions. In the case of the spleen, there was no hemostasis at 18 minutes. Twenty-five days were required for substantially complete absorption of the gelatin sponge.

*Example 2*

About 200 parts of a 2% aqueous solution of cellulose ether sodium salt used in Example 1 were placed in a cellophane bag in a bath of distilled water. Electrodes were placed inside the cellophane bag and in the surrounding distilled water bath outside the bag. A 3.5 volt D. C. potential was placed across the electrodes, the cathode being outside the bag. The 3.5 volt potential and approximately 0.1 ampere current was maintained for three days, during which time the bath water was changed continuously, and solutions were at about room temperature. The pH of the cellulose ether solution at this time had reduced to 3.15, which is equivalent to 10% neutralization. That is, 10% of the carboxyl groups of the cellulose ether were neutralized with sodium ions, and the remaining 90% were in the free acid form. The solution was heated in an autoclave at 250° F. for 20 minutes to reduce D. P. and cooled and frozen into bricks 0.3 cm. x 1.5 cm. x 10 cm. The bricks were freeze dried into sponges. The sponges were cut into sections 3 x 3 x 3 mm. and sterilized by heating at about 150° F. for one hour in the presence of concentrated gaseous formaldehyde (50% by volume). This treatment also imparted to the sponges a degree of insolubility. At this point the D. P. was indicated by a viscosity of about 8.0 seconds. The sections were then implanted in rats as in Example 1 and showed complete absorption on the 7th day postoperative examination.

*Example 3*

A 2% solution of cellulose ether sodium salt of the type used in Example 1 was electrodialyzed, using a potential of 3 volts, according to the procedure of Example 2. As the pH of the cellulose ether solution fell corresponding to the release of sodium ions, samples of the solution were extracted for testing. The first sample was extracted after 24 hours at pH 4.4 and the second after 36 hours at pH 3.65, which, for this type of cellulose ether, are equivalent to about 50% and about 25% neutralization, respectively. These solutions were then autoclaved at 250° F. for 20 minutes to reduce D. P. The solutions were frozen into bricks and the bricks freeze dried into sponges of free acid cellulose ether. The D. P. of the sponges was indicated by viscosity of about 14 seconds. Sections of the sponges were cut for implantation and were sterilized by heating at about 150° F. for one hour, in the presence of gaseous formaldehyde. The concentration of the formaldehyde in the gas was greater than about 50% by volume. The sterile sections were implanted in rats according to the procedure outlined in Example 1, and were found to be completely absorbed on the 15th day postoperative.

*Example 4*

A 1% solution of cellulose ether sodium salt of the type treated in Example 1 was electrodialyzed at 3 volts. 250 parts of the solution were introduced into the membrane, which was suspended in 2,250 parts of the same 1% solution. Electrodialysis was continued, according to the procedure of Example 2, until the pH of the solution inside the membrane fell to 3.15 (10 days), which corresponded with D. N. of 10%. This electrodialyzed solution was autoclaved at 250° F. for 20 minutes and freeze dried into sponges. Samples were prepared for implantation in rats by sterilization in an autoclave at 235° F. for 15 minutes. The treatment administered indicated that the sterilized free acid cellulose ether had D. P. measured by viscosity substantially less than 17.0 seconds. The implantation technique was the same as in Example 1 and showed complete absorption between 7 and 15 days postoperative.

*Example 5*

6,000 parts of a 5% aqueous solution of the type cellulose ether sodium salt treated in Example 1 were electrodialyzed to a limiting pH of 2.35 corresponding with 0% D. N. under a potential which averaged about 50 volts carrying an average current of about 1.0 ampere, for 97 hours at 130° F. 950 parts of the electrodialyzed free acid solution were refluxed on a steam bath at about 210° F. for 10 hours, at the end of which time its D. P. was indicated by a viscosity of 7 seconds. One per cent ethyl alcohol was then incorporated into the solution and the mix frozen while being agitated in a glass beaker. Heat was extracted by means of an ice-salt bath applied externally to the beaker. Cooling and agitation were continued until the beaker contents had assumed the consistency of a smooth sherbet of fine crystals. The sherbet was then transferred to molds and quickly frozen at −70° C. The frozen bricks were freeze dried. After drying, the articles were insolubilized by heating in air at 180° F. for 3 hours. By this technique hemostatic absorbable sponges of free acid cellulose ether were produced having substantially uniform pore size without the striated patterns produced by freezing the free acid gel in Example 1, or the solutions in Examples 2 to 4, inclusive.

*Example 6*

A 4% aqueous solution of the same type cellulose ether sodium salt as used in Example 1 was electrodialyzed at 10 volts, a current which varied between 150 to 350 milliamperes at about room temperature for 144 hours, at which time pH of the cellulose ether solution had fallen to its limiting value of 2.35, which represented substantially 0% D. N. At this point the free acid cellulose ether had D. P. indicated by viscosity of 15.2 seconds. A solution of "Enzyme 19 AP," sold by the Rohm & Haas Company, was prepared by adding 1 part to 300 parts of water. The mixture was allowed to stand for 10 minutes and filtered. One part of filtrate was diluted with 3.5 parts of water and added to 100 parts of the electrodialyzed solution. The mixture was allowed to stand 48 hours at about 75° F., at which point the D. P. was reduced to a value indicated by viscosity of 10.4 seconds. The enzyme-treated solution was frozen into bricks and the bricks freeze dried. Sections of the dried sponges of free acid cellulose ether formed were prepared for animal implantation by heat treatment in air at 180° F. for 3 hours to insolubilize and autoclaved at 235° F. for 15 minutes in open saturated steam to sterilize. The sections were evaluated for absorbability in rats according to the procedure of Example 1. Complete absorption was found between the 15th and 25th day postoperative.

*Example 7*

A vertical glass column 95 mm. in diameter and 1½ meters high and suitable inlet and outlet tubing connections for fluid at the bottom and top were assembled. The column was charged with ion exchange resin "IR–120," of the Rohm & Haas Company, an "Amberlite" nuclear sulfonic cationic exchange resin, to a bed depth of 18 inches. An aqueous solution of 10% hydrochloric acid was passed through the bed to activate the resin followed by flushing free of mineral acid with distilled water. A 2% aqueous solution of cellulose glycolic acid ether sodium salt of D. S. of 0.90 and D. P. indicated by 10.5 second viscosity was passed upwardly through the column and bed at the rate of 60 cc. per minute. 1,000 parts of cellulose ether solution emerging from the top of the column were collected and found to have a pH of 2.42, representing degree of neutralization 1%. The viscosity of the treated material, determined according to the standard procedure, was 10.5 seconds. A portion of the free acid solution was frozen and the brick lyophilized into a sponge. The sponge was heat treated at 180° F. for 3 hours in air to insolubilize and autoclaved at 235° F. for 15 minutes in open saturated steam to sterilize. The finished article had D. P. indicated by viscosity of 7.2 seconds and was of the type found by implantation tests to be completely absorbable.

*Example 8*

Twenty parts cellulose glycolic acid ether sodium salt of D. S. of 1.2 and high viscosity were dissolved in a solution of 40 parts sodium chloride and 1,000 parts water. 460 parts of 95% ethanol were added to the solution slowly with rapid agitation. The mixture was centrifuged and the gel produced was collected. The gel was flocculated by slow addition of 95% ethyl alcohol. The precipitate of reconstituted cellulose ether sodium salt was converted to the free acid by three washings in 80% ethyl alcohol, 20% aqueous hydrochloric acid, followed by three washings with 75% ethyl alcohol in water and two washings with 95% ethyl alcohol. The resultant free acid reconstituted cellulose ether was dried at 120° F. and at this point (designated as Sample I) had a D. S. of 1.21 and D. P. indicated by viscosity of 26.9 seconds.

The supernatant solution obtained after removal of the gel was mixed with an additional amount of 49 parts 95% ethanol with rapid agitation, and the incremental gel formed was centrifuged out. The supernatant liquor from this treatment was again mixed with 49 parts of 95% ethanol with agitation, and the incremental gel produced was flocculated with ethyl alcohol and converted to free acid cellulose ether as above. The latter gel was dried. The product at this point (designated as Sample II) had a D. S. of 1.21 and D. P. indicated by viscosity of 17.1 seconds.

Samples I and II were sterilized by treatment with gaseous formaldehyde for one hour at about 150° F. This treatment also insolubilized the products to an extent satisfactory for the implantation tests which were to follow. Absorbability of the samples was tested in rats according to the procedure outlined in Example 1, with the following results. Sample I was not completely absorbed in 25 days. Sample II showed complete absorbability between the 15th and 25th day postoperative examinations.

Example 9

A 4% aqueous cellulose glycolic acid ether sodium salt solution was prepared. The cellulose ether had a D. S. of 1.21 and viscosity of 26.8 seconds as determined by the standard procedure. The sodium salt solution was electrodialyzed by the procedure of Example 2, maintaining 11 volts and 0.3 ampere current flow for 11 days at room temperature. The solution after electrodialysis had a pH of 2.35, indicating substantially 0% neutralization. A portion of the solution was frozen into a brick and the brick lyophilized into a sponge. The sponge was cut into sections and sterilized with gaseous formaldehyde according to the procedure of Example 3 for implantation studies. The free acid cellulose ether product (designated as Sample I) had a viscosity of 17.8 seconds.

Another portion of the electrodialyzed solution was refluxed on a steam bath for about 1½ hours at 210° F. and frozen. The frozen bricks were lyophilized and sterilized with formaldehyde as above. The product, free acid cellulose glycolic acid ether (designated as Sample II), had a D. P. indicated by viscosity of 13.8 seconds. The samples were implanted in the back muscles of rats according to the technique described in Example 1, with the following results. A substantial portion of Sample I was still unabsorbed after the 25th day postoperative examination. Sample II was completely absorbed between the 15th and 25th day.

Example 10

A free acid cellulose glycolic acid ether sponge having a bulk density of .05 gm. per cc. prepared by the procedure of Example 5, having D. P. indicated by 6.9 second standard viscosity, D. S. of 1.2, and 0% D. N., was ground through a 20 mesh screen. A second portion of the sponge was ground through a 60 mesh screen. A portion of the 60 mesh powder was dropped into cold water and was observed to become wetted instantaneously. It did not, however, go into solution. A sample of unreconstituted free acid cellulose glycolic acid ether powder was dropped into water and observed to float on the surface of the water without becoming wetted.

The 20 mesh powder was then compressed into chisel-shaped pellets having 4 mm. square cross-section for a length of about 5 mm. and tapering to a point. The over-all length of each pellet was about 8 mm. After compression, the pellets, as long as they were dry, retained their dimensions unassisted by any external force. Water was added dropwise to a dry pellet whereupon it immediately and rapidly expanded to about 3–4 times its original volume without disintegrating. The swollen pellet retained substantially the shape of the dry pellet. Dry compressed pellets prepared from uncomminuted sponge material possess properties similar to those prepared from the comminuted material.

The Example 8 and 9 results show the importance of the upper D. P. limit of 17.4 seconds in determining complete absorbability of free acid cellulose glycolic acid ether, particularly in the case of the desired reconstituted articles.

In Example 2 the electrodialyzed and autoclaved solution which was frozen prior to lyophilization had 1.6% by weight solids content. In Example 4 the solution which was frozen and lyophilized had 1.0% solids content. The corresponding solutions in Examples 5 and 6 had 4.3 and 3.9% solids content, respectively. In Example 9 the solutions which were frozen for sponge preparation each had 3.96% solids content.

In the Example 5 procedure in which a "sherbet" is prepared from free acid cellulose ether solution before complete freezing and lyophilization to prepare a sponge, the use of a soluble aliphatic alcohol such as methyl, ethyl, or one of the propyl alcohols in proper amount, is important in obtaining a sherbet having desired small ice crystals. At least about 0.25% by weight of alcohol should be present in the solution. The preferred minimum amount, based on improved sherbet formation, is 0.40%. When concentrations of about 2% and above of alcohol are used, the free acid cellulose ether sponge product tends to become more powdery. Concentrations of 5% and above lead to the formation of a product which is quite powdery, and hence the latter concentration marks a broader upper limit of alcohol content. Polyhydric aliphatic alcohols such as ethylene glycol or glycerol may be utilized, but alcohol concentrations required for the "sherbet" effect will generally be higher. Further, since these alcohols are nonvolatile, they will appear in the final product. They may be used to provide a plasticizer in the end product where desired.

The principle just described may be applied to other soluble cellulose derivatives. That is, smooth sherbets of low concentration aqueous solutions of other soluble cellulose derivatives such as cellulose hydroxypropionic acid ether may be prepared by adding small amounts of an alcohol and treating the mixture in the manner set forth above for treating cellulose glycolic acid ether.

The foregoing description is presented as illustrative and it will be apparent that there are many modifications within the spirit and scope of the invention. Hence, the invention is to be limited only by the appended claims.

The claims are:

1. As a completely absorbable surgical product, cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette A. S. T. M. D–445 #300, as compared with a zero pipette reading of 5.0 seconds for a 0.50 N. NaOH solution at the same temperature, said cellulose ether having degree of substitution above about 0.5 and degree of neutralization in the approximate range 0 to 60%.

2. As a completely absorbable surgical product, reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette A. S. T. M. D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60%.

3. As a completely absorbable surgical product, reconstituted cellulose glycolic acid ether having degree of polymerization indicated by viscosity of a 0.50% by weight solution of said cellulose ether in a 0.50 N. NaOH solution at 25.50° C. in the approximate range 5.7 to 12.0 seconds as determined in a modified Ostwald-Fenske viscosimeter pipette A. S. T. M. D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60%.

4. As a completely absorbable surgical product, a sterile and substantially water-insoluble cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette A. S. T. M. D–445 #300, as compared with a zero pipette reading of 5.0 seconds for a 0.50 N. NaOH solution at the same temperature, said degree of polymerization having been obtained by hydrolysis of the cellulose chain, said cellulose ether having degree of substitution above about 0.7 and degree of neutralization in the approximate range 0 to 15%.

5. As a completely absorbable fabricated surgical article, said article comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60%.

6. As a completely absorbable hemostatic fabricated surgical article, said article comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximately range 0 to 60% but sufficiently low so that the free carboxyl content of the cellulose is at least 0.5 per glucose unit, and having been insolubilized after fabrication of said article.

7. As a completely absorbable hemostatic fabricated surgical article, said article comprising reconstituted cellulose glycolic acid ether having degree of polymerization indicated by viscosity of a 0.50% by weight solution of said cellulose ether in a 0.50 N. NaOH solution at 25.50° C. in the approximate range 5.7 to 12.0 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by hydrolysis of the cellulose chain, said cellulose ether having degree of substitution above about 0.5 and degree of neutralization in the approximate range 0 to 60% but sufficiently low so that the free carboxyl content of the cellulose is at least 0.5 per glucose unit, and having been insolubilized after fabrication of said article.

8. As a sterile completely absorbable hemostatic fabricated surgical article, said article comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by hydrolysis of the cellulose chain, said cellulose ether having degree of substitution above about 0.7 and degree of neutralization in the approximate range 0 to 15%, and having been heat treated after fabrication of said article at temperature for time sufficient to reduce substantially the solubility of said cellulose ether in water.

9. As a completely absorbable surgical product, a sterile hemostatic artificial sponge, said sponge comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60% but sufficiently low so that the free carboxyl content of the cellulose is at least 0.5 per glucose unit, and having been insolubilized after fabrication of said sponge.

10. As a completely absorbable surgical product, a sterile filament comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60% but sufficiently low so that the free carboxyl content of the cellulose is at least 0.5 per glucose unit, and having been insolubilized after fabrication of said filament.

11. As a completely absorbable surgical product, a sterile film comprising reconstituted cellulose glycolic acid ether having degree of polymerization indicated by viscosity of a 0.50% by weight solution of the cellulose ether in a 0.50 N. NaOH solution at 25.50° C. in the range about 5.7 to not greater than 17.4 seconds as dedetermined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60% but sufficiently low so that the free carboxyl content of the cellulose is at least 0.5 per glucose unit, and having been insolubilized after fabrication of said film.

12. As a completely absorbable surgical product, a sterile powder comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said degree of polymerization having been obtained by reducing the average length of the cellulose chain, said cellulose ether having degree of substitution above about 0.5 and degree of neutralization in the approximate range 0 to 60% but sufficiently low so that the free carboxyl content of the cellulose is at least 0.5 per glycose unit, and having been insolubilized after fabrication of said powder.

13. The method for preparing completely absorbable fabricated surgical articles of reconstituted cellulose glycolic acid ether having degree of substitution above about 0.5, from cellulose glycolic acid ether containing inorganic ionic impurities, said method comprising the steps of preparing a solvated form of said cellulose ether by dissolving said cellulose ether in a solvent therefor, separating inorganic ionic impurities to leave a purified cellulose ether having degree of neutralization in the approximate range 0 to 60%, coagulating and desolvating said cellulose ether into said fabricated article, and reducing the average length of the cellulose chain of the said cellulose ether until its degree of polymerization is indicated by viscosity of a 0.50% by weight solution of said free acid in a 0.50 N. NaOH solution at 25.50° C.

in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

14. The method for preparing completely absorbable fabricated surgical articles of reconstituted cellulose glycolic acid ether having degree of substitution above about 0.5, from cellulose glycolic acid ether containing inorganic ionic impurities, said method comprising the steps of preparing a hydrated form of said cellulose ether by dissolving said cellulose ether in a solvent therefor, separating inorganic ionic impurities to leave a purified cellulose ether having degree of neutralization in the approximate range 0 to 60% but sufficiently low so that the free carboxyl content of the cellulose is at least 0.5 per glucose unit, coagulating and dehydrating said cellulose ether into said fabricated article, reducing the average length of the cellulose chain of the said cellulose ether until its degree of polymerization is indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature, and insolubilizing and sterilizing said fabricated article.

15. The method of preparing a completely absorbable hemostatic artificial surgical sponge of cellulose glycolic acid ether having degree of substitution above about 0.5, from cellulose glycolic acid ether containing inorganic ionic impurities, said method comprising the steps of preparing a hydrated form of said cellulose ether by dissolving said cellulose ether in a solvent therefor, separating inorganic ionic impurities to leave a purified cellulose ether having degree of neutralization in the approximate range 0 to 60% but sufficiently low so that the free carboxyl content of the cellulose is at least 0.5 per glucose unit, freezing said purified hydrate, drying said frozen material under vacuum while maintaining it in the solid state, and reducing the average length of the cellulose chain of the said cellulose ether until its degree of polymerization is indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

16. The method of preparing a completely absorbable hemostatic artificial surgical sponge of cellulose glycolic acid ether having degree of substitution above about 0.7, said method comprising the steps of preparing a hydrated form of said cellulose ether containing inorganic ionic impurities dissolving said cellulose ether in a solvent therefor, separating inorganic ionic impurities to leave a purified cellulose ether having degree of neutralization in the approximate range 0 to 15%, freezing said purified hydrate, drying said frozen material under vacuum while maintaining it in the solid state, and reducing the average length of the cellulose chain of the said cellulose ether until its degree of polymerization is indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

17. The method of preparing a completely absorbable surgical filament of cellulose glycolic acid ether having degree of substitution above about 0.5, from cellulose glycolic acid ether containing inorganic ionic impurities, said method comprising the steps of preparing a hydrated form of said cellulose ether by dissolving said cellulose ether in a solvent therefor, separating inorganic ionic impurities to leave a purified cellulose ether having degree of neutralization in the approximate range 0 to 60%, spinning said hydrated cellulose ether into filaments, coagulating and dehydrating said filaments and reducing the average length of the cellulose chain of the said cellulose ether until its degree of polymerization is indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

18. The method of preparing a completely absorbable surgical film of cellulose glycolic acid ether having degree of substitution above about 0.5, from cellulose glycolic acid ether containing inorganic ionic impurities, said method comprising the steps of preparing a hydrated form of said cellulose ether by dissolving said cellulose ether in a solvent therefor, separating inorganic ionic impurities to leave a purified cellulose ether having degree of neutralization in the approximate range of 0 to 60%, casting said cellulose ether into a dehydrated film, coagulating and dehydrating said film, and reducing the average length of the cellulose chain of the said cellulose ether until its degree of polymerization is indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

19. In the method of preparing a completely absorbable fabricated surgical article of cellulose glycolic acid ether having degree of substitution above about 0.5, the operating steps which comprise subjecting cellulose glycolic acid ether in insoluble form and having degree of neutralization in the approximate range 0 to 60% to the action of water at temperature above 212° F. and saturation conditions for time sufficient to hydrate said cellulose ether, dehydrating said hydrated cellulose ether into said fabricated article and reducing the average length of the cellulose chain of the said cellulose ether until its degree of polymerization is indicated by viscosity of a 0.50% by weight solution of said cellulose ether in a 0.50 N. NaOH solution at 25.50° C. in the range of about 5.7 to not greater than 17.4 seconds as determined in a modified Ostwald-Fenske viscosimeter pipette ASTM D-445 #300, as compared with a zero pipette reading of 5.0 seconds for a 0.50 N. NaOH solution at the same temperature.

20. In the method for preparing completely absorbable surgical articles of reconstituted cellulose glycolic acid ether having degree of substitution above about 0.5 from cellulose glycolic acid ether containing inorganic ionic impurities, the steps which comprise electrodialyzing an aqueous solution of said cellulose ether at temperature above about 100° F. and time sufficient to separate inorganic ionic impurities to obtain a purified cellulose ether having degree of neutralization in the approximate range 0 to 60% and degree of neutralization lower than said cellulose ether before electrodialysis, and simultaneously with said purification reduce the degree of polymerization of said cellulose ether into the range of complete absorbability.

21. In the method for preparing completely absorbable surgical articles of reconstituted cellulose glycolic acid ether having degree of substitution above about 0.5 from unabsorbable cellulose glycolic acid ether containing inorganic ionic impurities, the steps which comprise electrodialyzing an aqueous solution of a salt of said cellulose ether at temperature in the approximate range 180–250° F. and time sufficient to separate inorganic ionic impurities to obtain a purified cellulose ether having degree of neutralization in the approximate range 0 to 60% and degree of neutralization lower than said cellulose ether before electrodialysis, and, simultaneously with said purification reduce the degree of polymerization of said cellulose ether into the range of complete absorbability.

22. A completely absorbed surgical powder, said powder comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said cellulose ether having degree of substitution above about 0.5 and degree of neutralization in the approximate range 0 to 60%, said powder being composed of particles below about 20 mesh size and having been prepared by comminuting a cellulose glycolic acid ether sponge, said particles being highly porous and readily wetted by water.

23. The method for preparing a smooth sherbet of fine ice crystals dispersed in an aqueous solution of a soluble cellulose derivative, which comprises mixing with an aqueous solution of not more than about 10% by weight of a soluble cellulose derivative a soluble aliphatic alcohol in amount in the approximate range 0.25–5.0% of said solution; and simultaneously agitating and cooling said mixture to a temperature sufficiently low to form said sherbet.

24. In the method for preparing a completely absorbable hemostatic artificial surgical sponge of cellulose glycolic acid ether having degree of substitution above about 0.5, from cellulose glycolic acid ether containing inorganic ionic impurities, by preparing an aqueous solution of said cellulose ether, separating inorganic ionic impurities to leave a purified free acid cellulose ether having degree of neutralization in the approximate range 0 to 60% but sufficiently low so that the free carboxyl content of the cellulose is at least 0.5 per glucose unit, freezing said purified hydrate and drying said frozen material under vacuum while maintaining it in the solid state; the improvement which comprises mixing with said aqueous cellulose ether solution a soluble aliphatic alcohol in amount in the approximate range 0.25–5.0% of said solution; and simultaneously agitating and cooling said mixture to a temperature sufficiently low to form a sherbet before completely freezing said solution.

25. The method of claim 24 in which the alcohol is a monohydric alcohol containing not more than three carbon atoms.

26. The method of claim 25 in which the amount of alcohol is in the approximate range 0.4–2.0% of said solution.

27. An absorbable surgical pellet comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 17.4 seconds as determined in a modified Ostwald-Fenske viscosimeter pipette ASTM D–445 #300, as compared with a zero pipette reading of 5.0 seconds for a 0.50 N. NaOH solution at the same temperature, said cellulose ether having degree of substitution above about 0.5 and degree of neutralization in the approximate range 0 to 60%; said pellet having been prepared by compressing cellulose glycolic acid ether having sponge structure, said pellet having the property of normally retaining its compressed condition when dry and undergoing rapid and spontaneous expansion while still retaining its general shape when treated with liquid water.

28. An absorbable surgical pellet comprising reconstituted cellulose glycolic acid ether having degree of polymerization indicated by viscosity of a 0.50% by weight solution of said cellulose ether in a 0.50 N. NaOH solution at 25.50° C. in the range about 5.7 to not greater than 12.0 seconds as determined in a modified Ostwald-Fenske viscosimeter pipette ASTM D–445 #300, as compared with a zero pipette reading of 5.0 seconds for a 0.50 N. NaOH solution at the same temperature, said cellulose ether having degree of substitution above about 0.5 and degree of neutralization in the approximate range 0 to 15%; said pellet having been prepared by compressing comminuted cellulose glycolic acid ether having sponge structure, said pellet having the property of normally retaining its compressed condition when dry and undergoing rapid and spontaneous expansion while still retaining its general shape when treated with liquid water.

References Cited in the file of this patent

UNITED STATES PATENTS

| | | |
|---|---|---|
| 2,036,257 | Craik | Apr. 7, 1936 |
| 2,160,106 | Maxwell | May 30, 1939 |
| 2,253,297 | Houghton et al. | Aug. 19, 1941 |
| 2,265,919 | Lilienfeld | Dec. 9, 1941 |
| 2,331,858 | Freeman et al. | Oct. 12, 1943 |
| 2,420,949 | Hager et al. | May 20, 1947 |
| 2,498,208 | Houk | Feb. 21, 1950 |
| 2,513,807 | Lamborn | July 4, 1950 |
| 2,592,686 | Groombridge et al. | Apr. 15, 1952 |
| 2,617,800 | Bergman | Nov. 11, 1952 |

FOREIGN PATENTS

| | | |
|---|---|---|
| 714,870 | Germany | Dec. 9, 1941 |

OTHER REFERENCES

Cellulose and Cellulose Derivatives (Ott), Interscience Publishers, Inc., New York City (1943). (Pages 785–7 are cited. Copy in Patent Office Library and in Division 63.)

"Journal of Biochemistry," vol. 66 (1925), pages 371 thru 379, article by Hoffman et al.; copy in Sci. Lib.